United States Patent
Lee

(10) Patent No.: US 12,134,706 B2
(45) Date of Patent: Nov. 5, 2024

(54) ANTISTATIC SILICONE RUBBER COMPOSITION

(71) Applicant: DOW SILICONES CORPORATION, Midland, MI (US)

(72) Inventor: Gyuyoung Lee, Seoul (KR)

(73) Assignee: DOW SILICONES CORPORATION, Midland, MI (US)

( * ) Notice: Subject to any disclaimer, the term of this patent is extended or adjusted under 35 U.S.C. 154(b) by 693 days.

(21) Appl. No.: 17/422,826

(22) PCT Filed: Jan. 10, 2020

(86) PCT No.: PCT/KR2020/000440
§ 371 (c)(1),
(2) Date: Jul. 14, 2021

(87) PCT Pub. No.: WO2020/149578
PCT Pub. Date: Jul. 23, 2020

(65) Prior Publication Data
US 2022/0081566 A1 Mar. 17, 2022

(30) Foreign Application Priority Data
Jan. 17, 2019 (KR) .................. 10-2019-0006253

(51) Int. Cl.
| | |
|---|---|
| C08L 83/04 | (2006.01) |
| C08G 77/12 | (2006.01) |
| C08G 77/20 | (2006.01) |
| C08K 5/00 | (2006.01) |
| C08K 5/544 | (2006.01) |
| C08K 5/5445 | (2006.01) |
| C09D 183/04 | (2006.01) |

(52) U.S. Cl.
CPC ........... *C09D 183/04* (2013.01); *C08G 77/12* (2013.01); *C08G 77/20* (2013.01); *C08K 5/0075* (2013.01); *C08K 5/544* (2013.01); *C08K 5/5445* (2021.01); *C08L 83/04* (2013.01); *C08K 2201/017* (2013.01); *C08L 2201/04* (2013.01); *C08L 2205/02* (2013.01)

(58) Field of Classification Search
CPC ... C09D 183/04; C08L 83/04; C08L 2201/04; C08G 77/12; C08G 77/20; C08K 2201/017; C08K 5/0075
USPC .......................................................... 524/188
See application file for complete search history.

(56) References Cited

U.S. PATENT DOCUMENTS

| | | | |
|---|---|---|---|
| 5,540,953 | A | 7/1996 | Harrington |
| 5,904,887 | A | 5/1999 | Nakamura et al. |
| 6,043,309 | A | 3/2000 | Nakamura et al. |
| 8,222,341 | B2 | 7/2012 | Chiang |
| 2001/0051667 | A1 | 12/2001 | Hayashida et al. |
| 2010/0236897 | A1* | 9/2010 | Chiang .................. C08L 83/04 198/782 |
| 2010/0285168 | A1 | 11/2010 | Mogi et al. |
| 2011/0069392 | A1* | 3/2011 | Yamazaki ............ G02B 5/0242 525/100 |
| 2011/0230609 | A1* | 9/2011 | Oshita ................ C08G 18/4238 524/80 |
| 2014/0051788 | A1 | 2/2014 | Suzuki |
| 2017/0267905 | A1 | 9/2017 | Nakamura et al. |
| 2022/0064450 | A1 | 3/2022 | Lee |

FOREIGN PATENT DOCUMENTS

| | | |
|---|---|---|
| CN | 1837987 A | 9/2006 |
| CN | 102030991 A | 4/2011 |
| CN | 103421323 A | 12/2013 |
| CN | 107541177 A | 1/2018 |
| JP | H0641860 A | 2/1994 |
| JP | H06172655 A | 6/1994 |
| JP | 2001164118 A | 6/2001 |
| JP | 2004204388 A | 7/2004 |
| JP | 2013241532 A | 12/2013 |
| JP | 2013241563 A | 12/2013 |
| JP | 2014105309 A | 6/2014 |
| JP | 2017145396 A | 8/2017 |
| KR | 1020060092088 A | 8/2006 |
| KR | 101695316 B1 | 1/2017 |
| WO | 2008057155 A1 | 5/2008 |
| WO | 2015102354 A1 | 7/2015 |

OTHER PUBLICATIONS

Machine assisted English translation of JP2017145396A obtained from https://worldwide.espacenet.com on Dec. 18, 2023, 12 pages.
Machine assisted English translation of JP2014105309A obtained from https://worldwide.espacenet.com on Dec. 18, 2023, 16 pages.
Machine assisted English translation of JP2013241563A obtained from https://patents.google.com on Jul. 27, 2022, 16 pages.

(Continued)

*Primary Examiner* — Ruiyun Zhang
(74) *Attorney, Agent, or Firm* — Warner Norcross + Judd LLP

(57) ABSTRACT

Provided is an antistatic silicone rubber composition. The composition comprises at least one lithium compound selected from the group consisting of a lithium amide, lithium silylamide, lithium alkyl phosphate salt, lithium phenoxide, lithium sulfate and a lithium permanganate, in an amount of from about 0.1 to about 15 mass % of the composition. In general, the composition may comprise: (A) an organopolysiloxane having at least two silicon atom-bonded alkenyl groups per molecule; (B) an organopolysiloxane having at least two silicon atom-bonded hydrogen atoms per molecule; (C) a hydrosilylation catalyst; and (D) the at least one lithium compound as described above. The composition generally exhibits good curability, and cures to form a silicone rubber exhibiting excellent antistatic properties.

13 Claims, No Drawings

(56) References Cited

OTHER PUBLICATIONS

Machine assisted English translation of JPH06172655A obtained from https://patents.google.com/patent on Aug. 23, 2022, 5 pages.
Machine assisted English translation of JP2004204388A obtained from https://patents.google.com/patent on Aug. 23, 2022, 11 pages.
International Search Report for PCT/KR2020/000440 dated Apr. 21, 2020, 3 pages.
Machine assisted English translation of KR1020060092088A obtained from https://patents.google.com/patent on Jul. 13, 2021, 8 pages.
Machine assisted English translation of CN1837987A obtained from https://patents.google.com/patent on Jul. 13, 2021, 11 pages.
Machine assisted English translation of CN103421323A obtained from https://patents.google.com/patent on Jul. 13, 2021, 9 pages.
Machine assisted English translation of KR101695316B1 obtained from https://patents.google.com/patent on Jul. 13, 2021, 13 pages.
Machine assisted English translation of JP2013241532A obtained from https://patents.google.com/patent on Jul. 13, 2021, 9 pages.
Machine assisted English translation of WO2015102354A1 obtained from https://patents.google.com/patent on Jul. 13, 2021, 12 pages.
Machine assisted English translation of CN107541177A obtained from https://patents.google.com/patent on Jul. 13, 2021, 10 pages.

\* cited by examiner

ANTISTATIC SILICONE RUBBER COMPOSITION

CROSS-REFERENCE TO RELATED APPLICATIONS

This application is the U.S. National Stage of International Application No. PCT/KR2020/000440 filed on 10 Jan. 2020, which claims priority to and all advantages of Korean Application No. 10-2019-0006253 filed on 17 Jan. 2019, the content of which is incorporated herein by reference.

TECHNICAL FIELD

The present invention relates to an antistatic silicone rubber composition.

BACKGROUND ART

Silicone rubber has been used in a wide variety of applications by making full use of its excellent heat resistance, low temperature resistance, and electric properties. Such silicone rubber is generally provided in the form of a silicone rubber composition comprising an organopolysiloxane and a reinforcement filler. Organopolysiloxane and reinforcement filler such as silica are insulators, and the silicone rubber composition prepared by incorporating such reinforcement filler and the silicone rubber obtained by curing such composition will be electrostatically charged when they are brought in contact with various substances. Because of such electrostatic charge, the dust floating in the air will be adsorbed on the silicone rubber.

Antistatic silicone rubbers have been produced by using a hydrosilylation curable silicone rubber composition comprising a potassium salt such as $KBF_4$, $KClO_4$, $KPF_6$, $KAsF_6$, $KSbF_6$, $KSO_3CF_3$, $KN(SO_2CF_3)_2$, $KN(SO_2C_4F_9)_2$, $KSO_3C_4F_9$, $KC(SO_2CF_3)_3$, $KB(C_6H_5)_2$, and $KN(SO_2CF_2)_2CF_2$ (see Patent Document 1), and a hydrosilylation curable silicone rubber composition comprising a lithium salt such as $LiBF_4$, $LiClO_4$, $LiPF_6$, $LiAsF_6$, $LiSbF_6$, $LiSO_3CF_3$, $LiN(SO_2CF_3)_2$, $LiSO_3C_4F_9$, $LiC(SO_2CF_3)_3$, $LiB(C_6H_5)_2$, and the like (see Patent Document 2). However, use of such potassium salts or lithium salts has been associated with the problem of poisoning a hydrosilylation catalyst in the composition which resulted in the failure of realizing sufficient curing at relatively low temperatures.

PRIOR ART DOCUMENTS

Patent Documents

Patent Document 1: Chinese Patent Application Publication No. 103421323 A
Patent Document 2: Korean Patent Application Publication No. 10-2006-0092088 A

DISCLOSURE OF INVENTION

Technical Problem

An object of the present invention is to provide an antistatic silicone rubber composition which exhibits good curability at relatively low temperatures, and cures to form a silicone rubber exhibiting good antistatic properties.

Solution to Problem

The antistatic silicone rubber composition of the present invention comprises at least one lithium compound selected from the group consisting of a lithium amide, lithium silylamide, lithium alkyl phosphate salt, lithium phenoxide, lithium sulfate and a lithium permanganate, in an amount of from about 0.1 to about 15 mass % of the composition.

The lithium amide may be represented by the general formula:

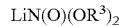

$$LiN(O)(OR^3)_2$$

wherein $R^1$ are the same or different alkyl groups having 1 to 12 carbon atoms.

The lithium silylamide may be represented by the general formula:

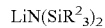

$$LiN(SiR^2{}_3)_2$$

wherein $R^2$ are the same or different alkyl groups having 1 to 12 carbon atoms.

The lithium alkyl phosphate salt may be represented by the general formula:

$$LiOP(O)(OR^3)_2$$

wherein $R^3$ are the same or different alkyl groups having 1 to 12 carbon atoms.

In various embodiments, the antistatic silicone rubber composition of the present invention can be cured by a hydrosilylation reaction. Such the composition may comprise:

(A) an organopolysiloxane having at least two silicon atom-bonded alkenyl groups per molecule;

(B) an organopolysiloxane having at least two silicon atom-bonded hydrogen atoms per molecule, in an amount such that a content of silicon atom-bonded hydrogen atoms in this component is from about 0.1 to about 10 moles per 1 mole of silicon atom-bonded alkenyl groups in component (A);

(C) a hydrosilylation catalyst, in a sufficient amount to cure the composition; and (D) at least one lithium compound selected from the group consisting of a lithium amide, lithium silylamide, lithium alkyl phosphate salt, lithium phenoxide, lithium sulfate and a lithium permanganate, in an amount of from about 0.1 to about 15 mass % of the composition.

In certain embodiments, the composition further comprises:

(E) a hydrosilylation reaction inhibitor, in an amount of from about 0.001 to about 1 mass % of the composition.

The composition may be useful for a rubber mold-making material.

The antistatic silicone rubber of the present invention is obtained by curing the antistatic silicone rubber composition. The silicone rubber may have a surface resistivity of from about $10^{10}$ to about $10^{12}$ Ω/square.

Advantageous Effects of Invention

The antistatic silicone rubber composition according to the present invention, exhibits good curability at relatively low temperatures, and can cure to form a silicone rubber exhibiting good antistatic properties.

Definitions

The terms "comprising" or "comprise" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, the term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and/or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

MODE FOR THE INVENTION

<Antistatic Silicone Rubber Composition>

First, the antistatic silicone rubber composition of the present invention will be described in detail. In various embodiment, the antistatic silicone rubber composition comprises at least one lithium compound selected from the group consisting of a lithium amide, lithium silylamide, lithium alkyl phosphate salt, lithium phenoxide, lithium sulfate and a lithium permanganate, in an amount of from about 0.1 to about 15 mass % of the composition.

The lithium amide is not limited, but it is preferably represented by the general formula:

$$LiNR^1_2.$$

In the formula, $R^1$ are the same or different alkyl groups having 1 to 12 carbon atoms. Examples of the alkyl groups include methyl groups, ethyl groups, propyl groups, isopropyl groups, butyl groups, isobutyl groups, tert-butyl groups, pentyl groups, neopentyl groups, hexyl groups, cyclohexyl groups, heptyl groups, octyl groups, nonyl groups, decyl groups, undecyl groups, and dodecyl groups, and methyl groups, ethyl groups and isopropyl groups are typical.

The lithium silylamide is not limited, but it is preferably represented by the general formula:

$$LiN(SiR^2_3)_2.$$

In the formula, $R^2$ are the same or different alkyl groups having 1 to 12 carbon atoms. Examples of the alkyl groups for $R^2$ include the same alkyl groups described for $R^1$, and methyl groups are typical.

The lithium alkyl phosphate salt is not limited, but it is preferably represented by the general formula:

$$LiOP(O)(OR^3)_2.$$

In the formula, $R^3$ are the same or different alkyl groups having 1 to 12 carbon atoms. Examples of the alkyl groups for $R^3$ include the same alkyl groups described for $R^1$, and methyl groups, ethyl groups and isopropyl groups are typical.

In various embodiments, the amount of the lithium compound is in an amount of from about 0.1 to about 15 mass %, optionally of from about 0.1 to about 10 mass %, or optionally of from about 0.5 to about 10 mass %, of the composition. It is thought that when the content of the lithium compound is not less than the lower limit of the range described above, the resulting silicone rubber has excellent antistatic properties, and on the other hand, when the content of the lithium compound is not greater than the upper limit of the range described above, the resulting silicone rubber composition has good curability.

In various embodiments, the lithium compound is added to a silicone rubber composition by using a polyol. By using the polyol, the lithium compound can be introduced into the silicone rubber composition, which makes it possible to achieve both antistatic properties and mechanical properties of resulting silicone rubber.

Examples of the polyol include polypropylene glycol, copolymers of propylene glycol and various polyalkylene glycols or various polyester polyols, and the like. Among them, polypropylene glycol is particularly preferable from the viewpoint that both antistatic properties and mechanical properties of the resulting silicone rubber can be achieved at a high level. The weight average molecular weight of the polyol used in the present invention is preferably about 100 to about 5,000, alternatively about 300 to about 4,000.

The use amount of the polyol is preferably about 5 to about 90 mass %, alternatively about 5 to about 80 mass %, and alternatively about 5 to about 70 mass %, of the total amount of the lithium compound and the polyol.

Cure system of the composition is not limited, but it is exemplified by a hydrosilylation reaction, condensation reaction, UV radiation, and radical reaction with organic peroxides, and the hydrosilylation reaction is typical.

The hydrosilylation curable silicone rubber composition may comprise:

(A) an organopolysiloxane having at least two silicon atom-bonded alkenyl groups per molecule;

(B) an organopolysiloxane having at least two silicon atom-bonded hydrogen atoms per molecule, in an amount such that a content of silicon atom-bonded hydrogen atoms in this component is from about 0.1 to about 10 moles per 1 mole of silicon atom-bonded alkenyl groups in component (A);

(C) a hydrosilylation catalyst, in a sufficient amount to cure the composition; and (D) at least one lithium compound selected from the group consisting of a lithium amide, lithium silylamide, lithium alkyl phosphate salt, lithium phenoxide, lithium sulfate and a lithium permanganate, in an amount of from about 0.1 to about 15 mass % of the composition.

Component (A) is an organopolysiloxane having at least two silicon atom-bonded alkenyl groups per molecule. Examples of the alkenyl groups include alkenyl groups having from 2 to 12 carbon atoms such as vinyl groups, allyl groups, butenyl groups, pentenyl groups, hexenyl groups, heptenyl groups, octenyl groups, nonenyl groups, decenyl groups, undecenyl groups, and dodecenyl groups, among which vinyl groups are preferable. In addition, examples of groups bonding to silicon atoms other than alkenyl groups in component (A) include alkyl groups having from 1 to 12 carbon atoms such as methyl groups, ethyl groups, propyl groups, isopropyl groups, butyl groups, isobutyl groups, tert-butyl groups, pentyl groups, neopentyl groups, hexyl groups, cyclohexyl groups, heptyl groups, octyl groups, nonyl groups, decyl groups, undecyl groups, and dodecyl groups; aryl groups having from 6 to 20 carbon atoms such as phenyl groups, tolyl groups, xylyl groups, and naphthyl groups; aralkyl groups having from 7 to 20 carbon atoms such as benzyl groups, phenethyl groups, and phenylpropyl groups; and groups in which some or all of the hydrogen atoms of these groups are substituted with halogen atoms such as fluorine atoms, chlorine atoms, or bromine atoms. Furthermore, the silicon atoms in component (A) may have small amounts of hydroxyl groups or alkoxy groups such as methoxy groups or ethoxy groups within a range that does not impair the object of the present invention.

Examples of the molecular structure of component (A) include a straight-chain structure, a partially branched straight-chain structure, a branched-chain structure, a cyclic structure, and a three-dimensional reticular structure. Component (A) may be one type of organopolysiloxane having these molecular structures or may be a mixture of two or more types of organopolysiloxanes having these molecular structures.

Examples of such component (A) include dimethylpolysiloxanes capped at both molecular terminals with dimethylvinylsiloxy groups, dimethylsiloxane-methylvinylsiloxane copolymers capped at both molecular terminals with dimethylvinylsiloxy groups, dimethylsiloxane-methylphenylsiloxane copolymers capped at both molecular terminals with dimethylvinylsiloxy groups, methylphenylpolysiloxanes capped at both molecular terminals with dimethylvinylsiloxy groups, dimethylsiloxane-methylvinylsiloxane copolymers capped at both molecular terminals with trimethylsiloxy groups, dimethylsiloxane-methylvinylsiloxane-methylphenylsiloxane copolymers capped at both molecular terminals with trimethylsiloxy groups, a mixture of dimethylpolysiloxanes capped at both molecular terminals with dimethylvinylsiloxy groups, and dimethylpolysiloxane capped at one molecular terminal with dimethylvinylsiloxy group and at another molecular terminal with dimethylhydroxysiloxy group, a mixture of dimethylpolysiloxanes capped at both molecular terminals with dimethylvinylsiloxy groups, and dimethylpolysiloxane capped at both molecular terminals with dimethylhydroxysiloxy group, and mixtures of two or more types thereof.

Component (B) is an organopolysiloxane having at least two silicon atom-bonded hydrogen atoms per molecule. Examples of groups bonding to silicon atoms other than hydrogen groups in component (B) include alkyl groups having from 1 to 12 carbon atoms such as methyl groups, ethyl groups, propyl groups, isopropyl groups, butyl groups, isobutyl groups, tert-butyl groups, pentyl groups, neopentyl groups, hexyl groups, cyclohexyl groups, heptyl groups, octyl groups, nonyl groups, decyl groups, undecyl groups, and dodecyl groups; aryl groups having from 6 to 20 carbon atoms such as phenyl groups, tolyl groups, xylyl groups, and naphthyl groups; aralkyl groups having from 7 to 20 carbon atoms such as benzyl groups, phenethyl groups, and phenylpropyl groups; and groups in which some or all of the hydrogen atoms of these groups are substituted with halogen atoms such as fluorine atoms, chlorine atoms, or bromine atoms. Furthermore, the silicon atoms in component (B) may have small amounts of hydroxyl groups or alkoxy groups such as methoxy groups or ethoxy groups within a range that does not impair the object of the present invention.

Examples of the molecular structure of component (B) include straight-chain, partially branched straight-chain, branched chain, cyclic, and three-dimensional reticular structures, and the molecular structure is preferably a straight-chain, partially branched straight-chain, branched chain, or three-dimensional reticular structure.

Examples of such component (B) include methylhydrogenpolysiloxanes capped at both molecular terminals with trimethylsiloxy groups, dimethylsiloxane-methylhydrogensiloxane copolymers capped at both molecular terminals with trimethylsiloxy groups, dimethylpolysiloxanes capped at both molecular terminals with dimethylhydrogensiloxy groups, dimethylsiloxane-methylhydrogensiloxane copolymers capped at both molecular terminals with dimethylhydrogensiloxy groups, methylhydrogensiloxane-diphenylsiloxane copolymers capped at both molecular terminals with trimethylsiloxy groups, methylhydrogensiloxane-diphenylsiloxane-dimethylsiloxane copolymers capped at both molecular terminals with trimethylsiloxy groups, copolymers consisting of $(CH_3)_2HSiO_{1/2}$ units and $SiO_{4/2}$ units, copolymers consisting of $(CH_3)_2HSiO_{1/2}$ units, $SiO_{4/2}$ units, and $(C_6H_5)SiO_{3/2}$ units, and mixtures of two or more types thereof.

The content of component (B) is an amount such that the content of silicon atom-bonded hydrogen atoms in this component is from about 0.1 to about 10 moles and preferably from about 0.5 to about 5 moles per 1 mole of silicon atom-bonded alkenyl groups in component (A). This is because when the content of component (B) is less than or equal to the upper limit of the aforementioned range, mechanical properties of the cured product are good, whereas when the content of component (B) is greater than or equal to the lower limit of the aforementioned range, curability of the composition is good.

Component (C) is a hydrosilylation catalyst used to accelerate the curing of the present composition. Examples of component (C) include platinum group element catalysts and platinum group element compound catalysts, and specific examples include platinum-based catalysts, rhodium-based catalysts, palladium-based catalysts, and combinations of at least two types thereof. In particular, platinum-based catalysts are preferable in that the curing of the present composition can be dramatically accelerated. Examples of these platinum-based catalysts include finely powdered platinum; platinum black; chloroplatinic acid, alcohol-modified chloroplatinic acid; chloroplatinic acid/diolefin complexes; platinum/olefin complexes; platinum/carbonyl complexes such as platinum bis(acetoacetate), and platinum bis(acetylacetonate); chloroplatinic acid/alkenylsiloxane complexes such as chloroplatinic acid/divinyltetramethyl disiloxane complexes, and chloroplatinic acid/tetravinyl tetramethyl cyclotetrasiloxane complexes; platinum/alkenylsiloxane complexes such as platinum/divinyltetramethyl disiloxane complexes, and platinum/tetravinyl tetramethyl cyclotetrasiloxane complexes; complexes of chloroplatinic acid and acetylene alcohols; and mixtures of two or more types thereof. In particular, platinum-alkenylsiloxane complexes are preferable in that the curing of the present composition can be accelerated.

Examples of the alkenylsiloxane used in the platinum-alkenylsiloxane complex include 1,3-divinyl-1,1,3,3-tetramethyldisiloxane, 1,3,5,7-tetramethyl-1,3,5,7-tetravinylcyclotetrasiloxane, alkenylsiloxane oligomers in which some of methyl groups of these alkenylsiloxanes are substituted with ethyl groups, phenyl groups, or the like, and alkenylsiloxane oligomers in which vinyl groups of these alkenylsiloxanes are substituted with allyl groups, hexenyl groups, or the like. In particular, 1,3-divinyl-1,1,3,3-tetramethyldisiloxane is preferable in that the stability of the platinum-alkenylsiloxane complex that is produced is good.

In order to improve the stability of the platinum-alkenylsiloxane complexes, it is preferable to dissolve these platinum-alkenylsiloxane complexes in an alkenylsiloxane oligomer such as 1,3-divinyl-1,1,3,3-tetramethyldisiloxane, 1,3-diallyl-1,1,3,3-tetramethyldisiloxane, 1,3-divinyl-1,3-dimethyl-1,3-diphenyldisiloxane, 1,3-divinyl-1,1,3,3-tetraphenyldisiloxane, or 1,3,5,7-tetramethyl-1,3,5,7-tetravinylcyclotetrasiloxane or an organosiloxane oligomer such as a dimethylsiloxane oligomer, and it is particularly preferable to dissolve the complexes in an alkenylsiloxane oligomer.

The content of component (C) is in an amount of from about 0.01 to about 1,000 ppm of the platinum group metal in this component in terms of mass units with respect to this composition. Specifically, the content is preferably an amount such that the content of platinum group metal in component (C) is in the range of from about 0.01 to about 500 ppm, alternatively in the range of from about 0.1 to about 100 ppm in terms of mass units with respect to the present composition. This is because when the content of component (C) is greater than or equal to the lower limit of the aforementioned range, curability of the composition is good, whereas when the content of component (C) is less than or equal to the upper limit of the aforementioned range, coloration of the cured product is suppressed.

Component (D) is at least one lithium compound selected from the group consisting of a lithium amide, a lithium silylamide, a lithium alkyl phosphate salt, a lithium phenoxide, a lithium sulfate and a lithium permanganate. Examples of such component (D) include components mentioned above.

The content of component (D) is in an amount of from about 0.1 to about 15 mass % of the present composition, preferably in the range of from about 0.1 to about 10 mass % of the present composition, alternatively in the range of from about 0.5 to about 10 mass % of the present composition. It is thought that when the content of component (D) is not less than the lower limit of the range described above, the resulting cured product has excellent antistatic properties, and on the other hand, when the content of component (D) is not greater than the upper limit of the range described above, the resulting curable silicone composition has good curability.

The composition may comprise (E) a hydrosilylation reaction inhibitor in order to prolong the usable time at ambient temperature and to improve storage stability. Examples of component (E) include acetylenic alcohols such as 1-ethynyl-cyclohexan-1-ol, 2-methyl-3-butyn-2-ol, 2-phenyl-3-butyn-2-ol, 2-ethynyl-isopropan-2-ol, 2-ethynyl-butan-2-ol, and 3,5-dimethyl-1-hexyn-3-ol; silylated acetylenic alcohols such as trimethyl (3,5-dimethyl-1-hexyn-3-oxy) silane, dimethyl bis(3-methyl-1-butyn-oxy) silane, methylvinyl bis(3-methyl-1-butyn-3-oxy) silane, and ((1,1-dimethyl-2-propynyl)oxy)trimethylsilane; unsaturated carboxylic esters such as diallyl maleate, dimethyl maleate, diethyl fumarate, diallyl fumarate, and bis(2-methoxy-1-methylethyl) maleate, mono-octylmaleate, mono-isooctyl-maleate, mono-allyl maleate, mono-methyl maleate, mono-ethyl fumarate, mono-allyl fumarate, and 2-methoxy-1-methylethylmaleate; ene-yne compounds such as 2-isobutyl-1-buten-3-yne, 3,5-dimethyl-3-hexen-1-yne, 3-methyl-3-penten-1-yne, 3-methyl-3-hexen-1-yne, 1-ethynyl cyclohexene, 3-ethyl-3-buten-1-yne, and 3-phenyl-3-buten-1-yne; and mixtures of two or more types thereof.

The content of component (E) is not limited, but it is preferably in an amount of from about 1 to about 10,000 ppm in this component in terms of mass units with respect to this composition. Specifically, the content is preferably an amount of from about 1 to about 5,000 ppm, alternatively an amount of from about 10 to about 5,000 ppm in this component in terms of mass units with respect to the present composition. This is because when the content of component (E) is greater than or equal to the lower limit of the aforementioned range, storage stability of the present composition is good, whereas when the content of component (E) is less than or equal to the upper limit of the aforementioned range, curability of the present composition at low temperatures is good.

The composition may comprise (F) a polyol in order to introduce component (D) into the present composition. Examples of the polyol for component (F) include polypropylene glycol, copolymers of propylene glycol and various polyalkylene glycols or various polyester polyols, and the like. Among them, polypropylene glycol is particularly preferable from the viewpoint that both antistatic properties and mechanical properties of the resulting silicone rubber can be achieved at a high level. The weight average molecular weight of the polyol used in the present invention is preferably about 100 to about 5,000, alternatively about 300 to about 4,000. The content of component (F) is not limited, but it is preferably about 5 to about 90 mass %, alternatively about 5 to about 80 mass %, and alternatively about 5 to about 70 mass %, of the total amount of components (D) and (F).

The composition may comprise (G) an organosiloxane free of alkenyl groups and silicon atom-bonded hydrogen atoms in a molecule. Examples of groups bonding to silicon atoms in component (G) include alkyl groups having from 1 to 12 carbon atoms such as methyl groups, ethyl groups, propyl groups, isopropyl groups, butyl groups, isobutyl groups, tert-butyl groups, pentyl groups, neopentyl groups, hexyl groups, cyclohexyl groups, heptyl groups, octyl groups, nonyl groups, decyl groups, undecyl groups, and dodecyl groups; aryl groups having from 6 to 20 carbon atoms such as phenyl groups, tolyl groups, xylyl groups, and naphthyl groups; aralkyl groups having from 7 to 20 carbon atoms such as benzyl groups, phenethyl groups, and phenylpropyl groups; and groups in which some or all of the hydrogen atoms of these groups are substituted with halogen atoms such as fluorine atoms, chlorine atoms, or bromine atoms. Furthermore, the silicon atoms in component (G) may have small amounts of hydroxyl groups or alkoxy groups such as methoxy groups or ethoxy groups within a range that does not impair the object of the present invention.

Examples of the molecular structure of component (G) include straight-chain, partially branched straight-chain, branched chain, cyclic, and three-dimensional reticular structures, and the molecular structure is preferably a straight-chain, partially branched straight-chain, branched chain, or three-dimensional reticular structure.

Examples of such component (G) include dimethylsiloxanes capped at both molecular terminals with trimethylsiloxy groups, dimethylsiloxanes capped at both molecular terminals with dimethylhydoxysiloxy groups, methylphenylsiloxanes capped at both molecular terminals with trimethylsiloxy groups, dimethylsiloxane-methylphenylsiloxane copolymers capped at both molecular terminals with trimethylsiloxy groups, and mixtures of two or more types thereof.

The content of component (G) is not limited, but it is preferably in an amount of about 1 to about 100 parts by mass, alternatively about 5 to about 100 parts by mass, and alternatively about 1 to about 50 parts by mass, per 100 parts by mass of component (A). This is because the viscosity of the composition can be reduced if the content of component (G) is not less than the lower limit of the above-mentioned range and mechanical properties of the resulting silicone rubber is improved if the content of component (G) is not more than the upper limit of the above-mentioned range.

The composition may comprise (H) reinforcing and/or non-reinforcing filler. Examples of the fillers include one or more of finely divided treated or untreated precipitated or fumed silica; precipitated or ground calcium carbonate, zinc carbonate; clays such as finely divided kaolin; quartz powder; aluminum hydroxide; zirconium silicate; diatomaceous earth; wollastonite; pyrophylate; and metal oxides such as fumed or precipitated titanium dioxide, cerium oxide, magnesium oxide powder, zinc oxide, and iron oxide. These may also include glass fiber; talc; aluminite; calcium sulphate (anhydrite); gypsum; calcium sulphate; magnesium carbonate; magnesium hydroxide (brucite); graphite; barite, a form of barium sulphate; copper carbonate, e.g., malachite; nickel carbonate, e.g., zarachite; barium carbonate, e.g., witherite; strontium carbonate e.g., strontianite, or a similar inorganic filler.

The content of component (H) is not limited, but it is preferably in an amount of about 1 to about 200 parts by mass, alternatively about 5 to about 150 parts by mass, and alternatively about 10 to about 150 parts by mass, per 100 parts by mass of component (A). This is because the heat resistance and mechanical properties of the resulting silicone rubber can be improved if the content of component (H) is not less than the lower limit of the above-mentioned range and the viscosity of the composition can be reduced if the content of component (H) is not more than the upper limit of the above-mentioned range.

The antistatic silicone rubber compositions of this invention can be prepared by combining all of ingredients at ambient temperature. Any of the mixing techniques and devices described in the prior art can be used for this purpose. The particular device used will be determined by the viscosity of the ingredients and the final curable composition. Cooling of the ingredients during mixing may be desirable to avoid premature curing.

The antistatic silicone rubber composition of the present invention is particularly useful as a rubber mold-making material.

<Antistatic Silicone Rubber>

Next, the antistatic silicone rubber of the present invention will be described in detail. In various embodiment, the antistatic silicone rubber is obtained by curing the antistatic silicone rubber composition described above. The shape of the silicone rubber is not particularly limited, and examples include a sheet shape and a film shape. In various embodiments, the silicone rubber has a surface resistivity of from about $10^{10}$ to about $10^{12}$ Ω/square.

EXAMPLES

The antistatic silicone rubber composition of the present invention will now be described using Practical and Comparative Examples. Note that the viscosity is the value obtained at 25° C. The characteristics of the anti-static silicone rubber composition and anti-static silicone rubber are evaluated as follows.

Viscosity

Viscosity is measured using a rotational viscometer such as a Brookfield synchrolectric viscometer or a Wells-Brookfield 52 cone/plate viscometer. Since virtually all materials measured are non-Newtonian in nature, no correlation should be expected between, results obtained using different spindles (cones) or speeds. The results are generally reported in centipoise, so that they are converted to viscosities (mPa·s). The viscosity was measured at 0.5 rpm and 5.0 rpm for 2 minutes. This method is based on ASTM D 4287 for cone/plate.

Hardness of the Cured Product

A cured product with 6 mm thickness was obtained by curing the 80° C. of low-temperature-curable silicone composition for 1 hour in the oven. Then, hardness of the cured product was measured by using Shore A hardness according to ASTM D 2240 "Standard Test Method for Rubber Property—Durometer Hardness".

Measurement of Electric Charge

The Surface Resistance of molded article was measured by the SURPA-385, surface resistance tester. The tester measures conductive static dissipate and insulating surface. The device follows the ASTM D 257 test method of parallel bar sensing.

Test Procedure: A Standard Size Specimen (145 mm×145 mm square flat plate with 2 mm thickness) is cured in 80° C. oven for 1 hour and then cooled down to room temperature. The article is placed between two electrodes. For sixty seconds, a voltage is applied and the resistance is measured. Surface Resistivity is measured and value is given by the instrument. The Surface Resistivity is expressed in ohms per square.

Practical Examples 1 to 8 and Comparative Examples 1 to 3

The following components were uniformly mixed according to the compositions (parts by mass) shown in Tables 1 to 2 to prepare the antistatic silicone rubber compositions of Practical Examples 1 to 8 and Comparative Examples 1 to 3. Moreover, in Tables 1 to 2, "SiH/Alkenyl ratio" represents the total moles of silicon atom-bonded hydrogen atoms in component (B) per 1 mole of total alkenyl groups in component (A) in the antistatic silicone rubber composition. Furthermore, the content of component (C) is expressed in terms of the content (ppm by mass) of platinum metal relative to the content of the antistatic silicone rubber composition, and the content of component (E) is expressed in terms of the content (ppm by mass) relative to the content of the antistatic silicone rubber composition.

The following components were used as component (A).

Component (a-1): a dimethylpolysiloxane capped at both molecular terminals with dimethylvinylsiloxy groups and having a viscosity of 2,000 mPa·s (content of vinyl groups: 0.23 mass %)

Component (a-2): a dimethylsiloxane·methylhexenylsiloxane copolymer capped at both molecular terminals with dimethylhexenylsiloxy groups and having a viscosity of 420 mPa·s (content of hexenyl groups: 2.0 mass %)

The following components were used as component (B).

Component (b-1): a dimethylpolysiloxane capped at both molecular terminals with dimethylhydrogensiloxy groups and having a viscosity of 10 mPa·s (content of silicon atom-bonded hydrogen atoms: 0.16 mass %)

Component (b-2): a dimethylsiloxane·methylhydrogensiloxane copolymer capped at both molecular terminals with trimethylsiloxy groups and having a viscosity of 5 mPa·s (content of silicon atom-bonded hydrogen atoms: 0.76 mass %)

The following component was used as component (C).

Component (c-1): solution of a platinum-1,3-divinyl-1,1,3,3-tetramethyldisiloxane complex in 1,3-divinyl-1,1,3,3-tetramethyldisiloxane (the solution contains 0.06% by mass of platinum)

The following components were used as component (D).

Component (d-1): lithium diisopropylamide
Component (d-2): lithium bis(trimethylsilyl)amide
The following components were used as comparison of component (D).
Component (d-3): LiPF6
Component (d-4): LiClO$_4$ The following component was used as component (E).

Component (e-1): 1,3,5,7-tetramethyl-1,3,5,7-tetravinylcyclotetrasiloxane

The following component was used as component (F).

Component (f-1): polypropylene glycol having an average molecular weight of 446

The following component was used as component (G).

Component (g-1): a dimethylpolysiloxane capped at both molecular terminals with trimethylsiloxy groups and having a viscosity of 5 mPa·s The following components were used as component (H).

Component (h-1): silica fine powder having a BET specific surface of 175 m$^2$/g and surface-treated with hexamethyldisilazane Component (h-2): zirconium silicate fine powder having an average particle diameter of 5 μm

TABLE 1

| Item | | | Prac. Exam. 1 | Prac. Exam. 2 | Prac. Exam. 3 | Prac. Exam. 4 | Comp. Exam. 1 |
|---|---|---|---|---|---|---|---|
| Antistatic | (A) | (a-1) | 51.10 | 51.10 | 51.10 | 51.10 | 51.10 |
| silicone | | (a-2) | 5.44 | 5.44 | 5.44 | 5.44 | 5.44 |
| rubber | (B) | (b-1) | 4.81 | 4.81 | 4.81 | 4.81 | 4.81 |
| composition | | (b-2) | 0.13 | 0.13 | 0.13 | 0.13 | 0.13 |
| (parts | (C) | (c-1) | 0.07 | 0.07 | 0.07 | 0.07 | 0.07 |
| by mass) | (D) | (d-1) | 0.83 | 0.99 | 5.15 | 7.94 | 0 |
| | (E) | (e-1) | 0.12 | 0.12 | 0.12 | 0.12 | 0.12 |
| | (F) | (f-1) | 0.83 | 0.83 | 0.83 | 0.83 | 0.83 |
| | (G) | (g-1) | 8.30 | 8.30 | 8.30 | 8.30 | 8.30 |
| | (H) | (h-1) | 25.54 | 25.54 | 25.54 | 25.54 | 25.54 |
| | | (h-2) | 1.57 | 1.57 | 1.57 | 1.57 | 1.57 |
| Content of (d-1) (mass %) | | | 0.8 | 1.0 | 5.0 | 7.5 | 0 |
| SiH/Alkenyl ratio | | | 1.50 | 1.50 | 1.50 | 1.50 | 1.50 |
| Shore A Hardness | | | 22 | 21 | 20 | 20 | 22 |
| Surface Resistivity (Ω/square) | | | 1E+11 | 1E+10 | 1E+10 | 1E+10 | 1E+14 |
| Required time to reach saturated Surface Resistivity (sec) | 25° C., 52.3% RH | | 180 | 120 | 34 | 30 | N/A |
| | 25° C., 80-90% RH | | 120 | 90 | >20 | >20 | N/A |

TABLE 2

| Item | | | Prac. Exam. 5 | Prac. Exam. 6 | Prac. Exam. 7 | Prac. Exam. 8 | Comp. Exam. 2 | Comp. Exam. 3 |
|---|---|---|---|---|---|---|---|---|
| Antistatic | (A) | (a-1) | 51.10 | 51.10 | 51.10 | 51.10 | 51.10 | 51.10 |
| silicone | | (a-2) | 5.44 | 5.44 | 5.44 | 5.44 | 5.44 | 5.44 |
| rubber | (B) | (b-1) | 4.81 | 4.81 | 4.81 | 4.81 | 4.81 | 4.81 |
| composition | | (b-2) | 0.13 | 0.13 | 0.13 | 0.13 | 0.13 | 0.13 |
| (parts | (C) | (c-1) | 0.07 | 0.07 | 0.07 | 0.07 | 0.07 | 0.07 |
| by mass) | (D) | (d-2) | 0.83 | 0.99 | 5.15 | 7.94 | 0 | 0 |
| | | (d-3) | 0 | 0 | 0 | 0 | 2.10 | 0 |
| | | (d-4) | 0 | 0 | 0 | 0 | 0 | 2.10 |
| | (E) | (e-1) | 0.12 | 0.12 | 0.12 | 0.12 | 0.12 | 0.12 |
| | (F) | (f-1) | 0.83 | 0.83 | 0.83 | 0.83 | 0.83 | 0.83 |
| | (G) | (g-1) | 8.30 | 8.30 | 8.30 | 8.30 | 8.30 | 8.30 |
| | (H) | (h-1) | 25.54 | 25.54 | 25.54 | 25.54 | 25.54 | 25.54 |
| | | (h-2) | 1.57 | 1.57 | 1.57 | 1.57 | 1.57 | 1.57 |
| Content of (d-2) (mass %) | | | 0.8 | 1.0 | 5.0 | 7.5 | 2.1 | 2.1 |
| SiH/Alkenyl ratio | | | 1.50 | 1.50 | 1.50 | 1.50 | 1.50 | 1.50 |
| Shore A Hardness | | | 21 | 21 | 20 | 20 | Uncured | 16 |
| Surface Resistivity ($\Omega$/square) | | | 1E+11 | 1E+10 | 1E+10 | 1E+10 | N/A | 1E+10-1E+11 |
| Required time to reach saturated Surface Resistivity (sec) | 25° C., 52.3% RH | | 180 | 120 | 34 | 30 | N/A | N/A |
| | 25° C., 80-90% RH | | 120 | 90 | >20 | >20 | N/A | N/A |

The antistatic silicone compositions as shown in Comparative Examples 2 and 3 were not cured at 80° C. for 1 hour. They were heated at 150° C. for 1 hour, however, the composition as shown in Comparative Example 2 was not cured, and the composition as shown in Comparative Example 3 was not fully cured.

INDUSTRIAL APPLICABILITY

The antistatic silicone rubber composition of the present invention exhibits good curability at relatively low temperatures, and cures to form a silicon rubber exhibiting good antistatic properties. Therefore, the antistatic silicone rubber composition of the present invention is suitable as sealing agents, protective coating agents, adhesive agents, and the like of electric/electronic devices.

The invention claimed is:

1. An antistatic silicone rubber composition comprising at least one lithium compound selected from the group consisting of a lithium amide, a lithium silylamide, and a lithium alkyl phosphate salt, in an amount of from about 0.1 to about 15 mass % of the composition;
   i) wherein the lithium amide is represented by the general formula:

$LiNR^1_2$ wherein $R^1$ are the same or different alkyl groups having 1 to 12 carbon atoms;
   ii) wherein the lithium silylamide is represented by the general formula:

$LiN(SiR^2_3)_2$ wherein $R^2$ are the same or different alkyl groups having 1 to 12 carbon atoms; and
   iii) wherein the lithium alkyl phosphate salt is represented by the general formula:

$LiOP(O)(OR^3)_2$ wherein $R^3$ are the same or different alkyl groups having 1 to 12 carbon atoms.

2. The antistatic silicone rubber composition according to claim 1, wherein the lithium amide is present in the composition.

3. The antistatic silicone rubber composition according to claim 1, wherein the lithium silylamide is present in the composition.

4. The antistatic silicone rubber composition according to claim 1, wherein the lithium alkyl phosphate salt is present in the composition.

5. The antistatic silicone rubber composition according to claim 1, curing via a hydrosilylation reaction.

6. The antistatic silicone rubber composition according to claim 5, comprising:
   (A) an organopolysiloxane having at least two silicon atom-bonded alkenyl groups per molecule;
   (B) an organopolysiloxane having at least two silicon atom-bonded hydrogen atoms per molecule, in an amount such that a content of silicon atom-bonded hydrogen atoms in this component is from about 0.1 to about 10 moles per 1 mole of silicon atom-bonded alkenyl groups in component (A);
   (C) a hydrosilylation catalyst, in a sufficient amount to cure the composition; and
   (D) the at least one lithium compound selected from the group consisting of the lithium amide, the lithium silylamide, and the lithium alkyl phosphate salt, in an amount of from about 0.1 to about 15 mass % of the composition.

7. The antistatic silicone rubber composition according to claim 6, further comprising:
   (E) a hydrosilylation reaction inhibitor, in an amount of from about 0.001 to about 1 mass % of the composition.

8. The antistatic silicone rubber composition according to claim 1 for a rubber mold-making material.

9. An antistatic silicone rubber obtained by curing the antistatic silicone rubber composition according to claim 1.

10. The antistatic silicone rubber according to claim 9, having a surface resistivity of from about $10^{10}$ to about $10^{12}$ $\Omega$/square.

11. The antistatic silicone rubber composition according to claim 6, wherein the lithium amide is present in the composition.

12. The antistatic silicone rubber composition according to claim 6, wherein the lithium silylamide is present in the composition.

13. The antistatic silicone rubber composition according to claim 6, wherein the lithium alkyl phosphate salt is present in the composition.

* * * * *